Oct. 31, 1967 H. R. THIEME 3,349,787
CONTROLLING APPARATUS
Filed Feb. 26, 1964 4 Sheets-Sheet 1

INVENTOR.
HORST R. THIEME
BY Arthur H. Swenson
ATTORNEY.

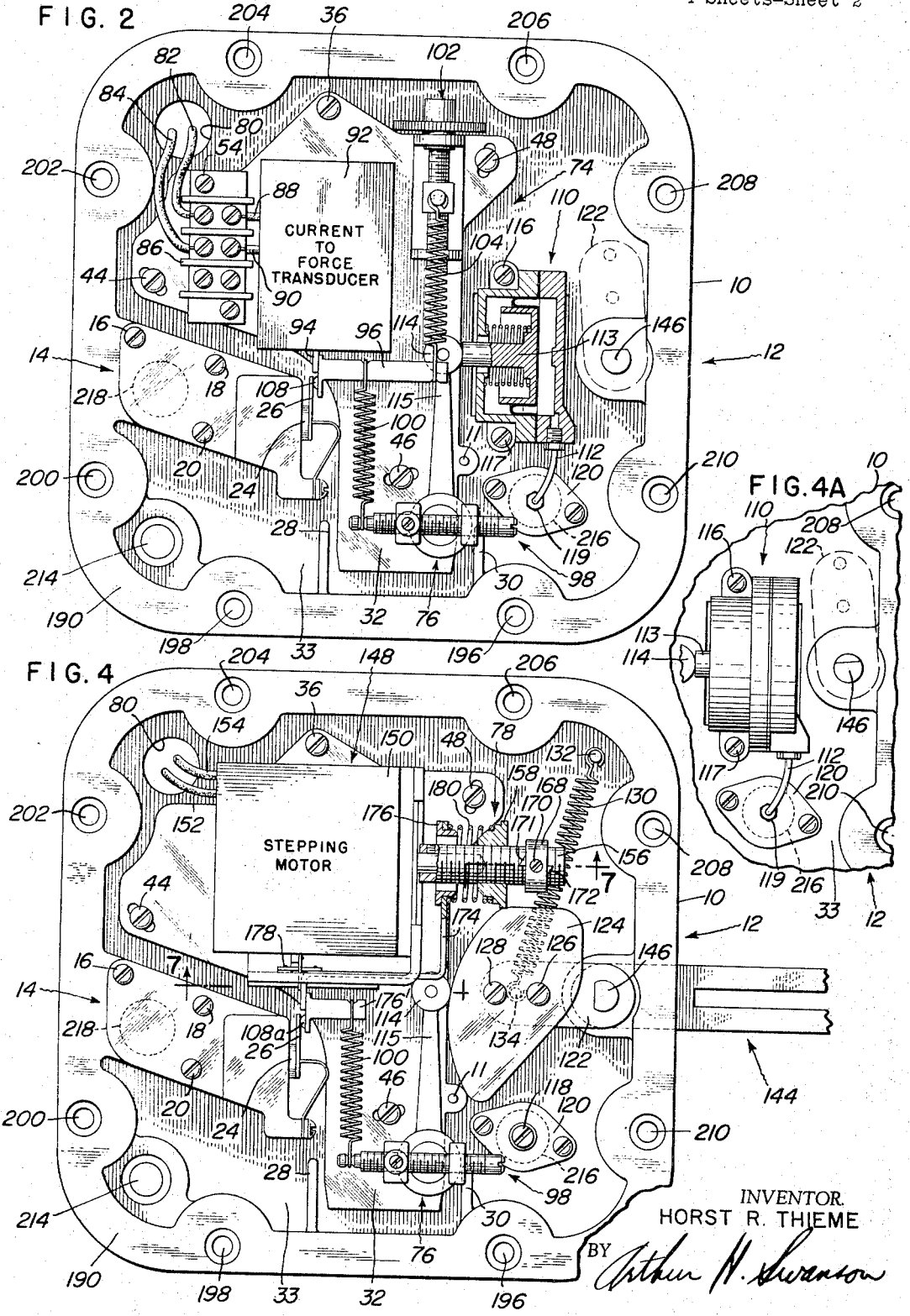

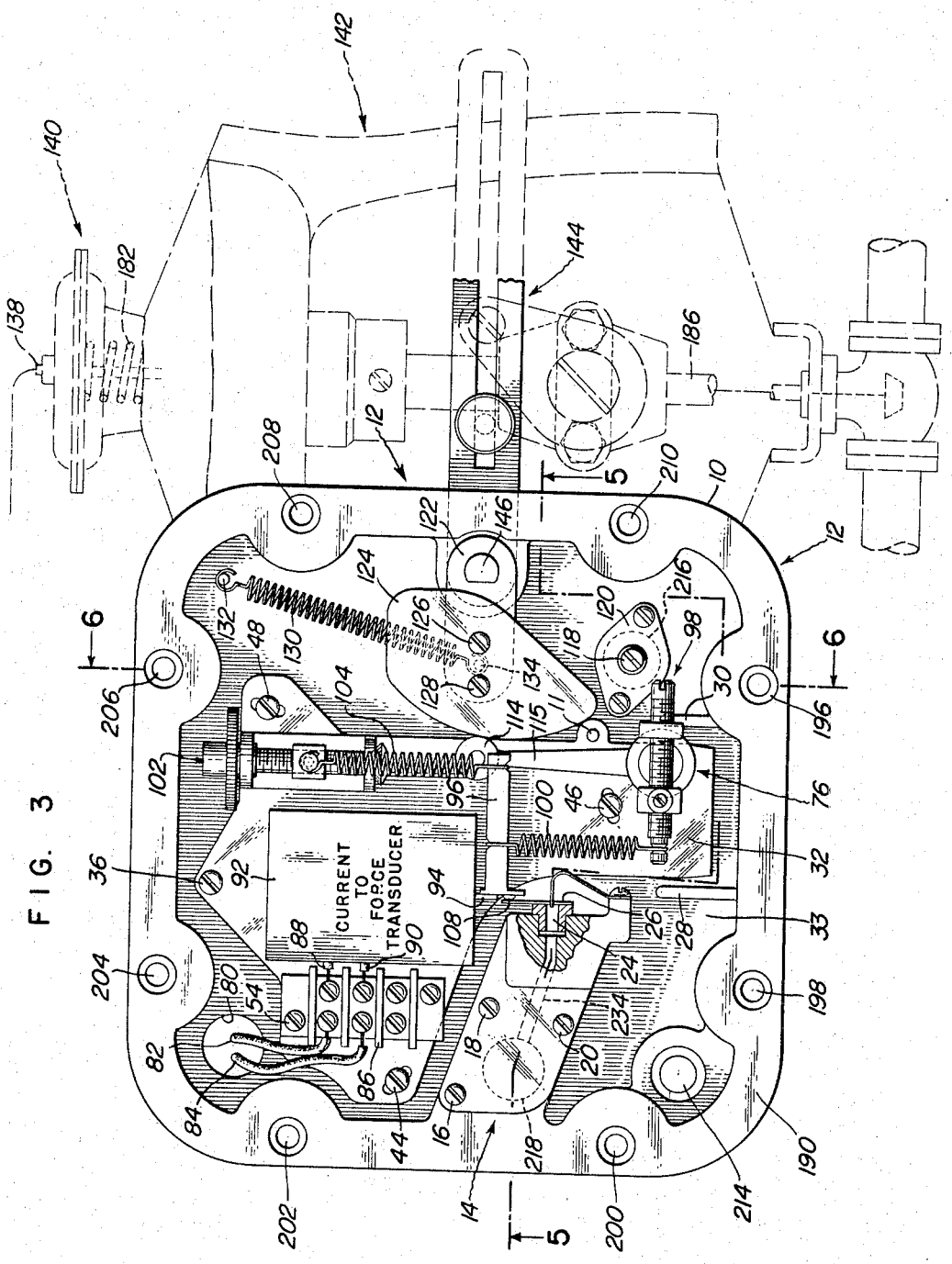

Oct. 31, 1967  H. R. THIEME  3,349,787
CONTROLLING APPARATUS
Filed Feb. 26, 1964  4 Sheets-Sheet 4

INVENTOR.
HORST R. THIEME
BY Arthur H. Swanson
ATTORNEY.

United States Patent Office 3,349,787
Patented Oct. 31, 1967

3,349,787
CONTROLLING APPARATUS
Horst R. Thieme, Horsham, Pa., assignor to Honeywell Inc., a corporation of Delaware
Filed Feb. 26, 1964, Ser. No. 347,529
1 Claim. (Cl. 137—85)

It is the general object of the present invention to disclose a single, universal, explosion-proof inclosure that is constructed to accommodate the mounting of any one of a number of different electrical and/or pneumatic-operated units therein.

More specifically, it is an object of the present invention to disclose an explosion-proof inclosure that is constructed to accommodate the mounting of any one of a plurality of different electro-pneumatic positioning or transducing units.

Prior to the present disclosure, it has been necessary for a purchaser to buy an entire new unit when it is desired to employ, for example an electro-pneumatic transducer unit in lieu of an existing electro-pneumatic positioner, a digital positioner or a digital transducer unit. To install such a substitute unit, it has also been necessary to go through a time-consuming operation of disconnecting mounting brackets and external electrical and pneumatic connections to the casing in order to remove the unit that is to be replaced and to then remount the mounting brackets and tighten the external connection to the casing of the newly-installed unit.

It is one of the objects of the present invention to disclose a single, explosion-proof inclosure whose external electrical and pneumatic connections do not have to be detached when it is desired to convert, for example an existing electro-pneumatic positioner, a digital positioner or a digital transducer unit, into an electro-pneumatic transducer or when it is desired to substitute any one of these units for any one of the remaining three units.

It has also heretofore been necessary for the purchaser of the aforementioned separate transducing and positioning units to keep in stock many spare parts for the different casings, pneumatic relays and external connections that are required for each of the four differently-constructed units.

It is, for the aforementioned reasons, therefore, another object of the invention to disclose a casing construction that will materially reduce the large number of spare parts a purchaser has heretofore been required to keep in stock by employing the use of the aforementioned, single, universal casing that may include a pneumatic relay and a nozzle-flapper unit which need not be replaced by another type of casing and relay or nozzle-flapper unit when it is desired to convert an existing electro-pneumatic positioner, a digital positioner or a digital transducer unit into an electro-pneumatic transducer or when it is desired to substitute any one of these units for any one of the remaining three units.

It is another object of the invention to disclose an explosion-proof casing of the aforementioned type that is provided with a pair of spaced-apart rib members between which a chassis plate and any one of the aforementioned positioning and transducing units mounted thereon can be readily moved into an operable position in which the aforementioned flapper unit can be readily actuated by the unit on the chassis plate between an open and closed position.

It is another object of the present invention to disclose a unique construction for an explosion-proof casing and a chassis plate that will enable a person controlling, for example an industrial process, with the aforementioned unit to replace one of these transducer and positioner units with another of these units in an abnormally rapid manner, thereby enabling him to reduce the costly down-time or non-productive process hours to minutes.

It is another object of the present invention to disclose a digital controller whose unique common part construction will enable this controller to be employed in the aforementioned universal casing as either a digital transducer or a digital positioner.

A better understanding of the present invention may be had when the following detailed description is read in connection with the accompanying drawings in which:

FIG. 2 shows a force balance electro-pneumatic transducer unit fixedly mounted on the adjustable chassis plate shown in FIG. 1 which unit utilizes a fluid pressure actuated diaphragm capsule which is detachably connected to the explosion proof casing for use as a negative feedback element;

FIG. 3 shows a force balance, electro-pneumatic positioner unit fixedly mounted on the adjustable chassis plate, shown in FIG. 1, which unit utilizes a valve stem linkage and cam as the negative feedback element;

FIG. 4 shows a force balance digital positioner unit fixedly mounted on the adjustable chassis plate shown in FIG. 1, which utilizes a valve stem, linkage and cam as a negative feedback element;

FIG. 4a shows all of the parts that are required to be substituted for the parts shown in FIG. 4 in order to convert the digital positioner disclosed in FIG. 4 to a digital transducer;

Figure 1:
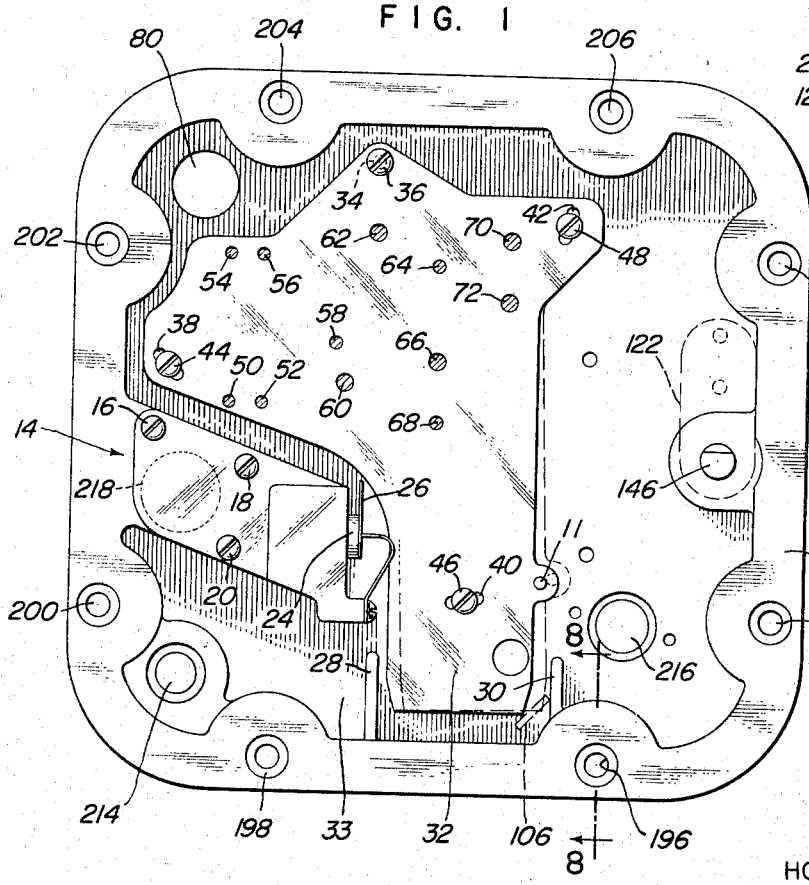
FIG. 1 shows a top plan view of the heretofore-referred-to casing and adjustable chassis plate.

FIG. 1 shows a first portion 10 of an inclosure or casing 12. This first casing portion 10 is comprised of a pneumatic flapper-nozzle unit 14 which is permanently mounted by means of connecting members 16, 18, 20 to the tapped holes in the base which are immediately below these connecting members in the casing portion 10. It should be understood that other means such as a suitable welding material could be used to connect the unit 14 to the casing portion 10. This unit 14 contains a nozzle 24 and a spring-biased flapper 26 positioned over the face of the nozzle 24.

The first casing portion 10 is also provided with two spaced-apart rib members 28, 30 which form an integral part of the first casing portion 10.

FIG. 1 shows a chassis plate 32 having a stop pin 11 therein and which plate is positioned in the hollowed-out part 33 of the casing portion 10. A countersunk hole is formed by the wall 34 of the plate 32 to accommodate a conical shaped pivot screw 36 that passes through the plate 32. The lower end of this screw 36 is threadedly connected to the wall forming the hollowed-out portion 33 of the casing part 10.

Three slotted wall portions 38, 40, 42 are also shown formed in the plate 32. The individual screws 44, 46, 48 are shown passing through the slotted wall portions 38, 40, 42 with which they are associated. Each screw 36, 44, 46 and 48 is threadedly connected to tapped holes, not shown, which are immediately below the screws in the hollowed-out portion 33 of the casing part 10.

It can be seen from the aforementioned description that the screws 36, 44, 46 and 48 can be slightly loosened from the position in which they are fixedly retaining the chassis plate 32 against the hollowed-out portion 33 of the casing portion 10. When the screws 36, 44–48 are slightly loosened in this manner, the plate 32 can be manually moved toward the flapper 26 of the flapper-nozzle unit 14.

Figure 5:
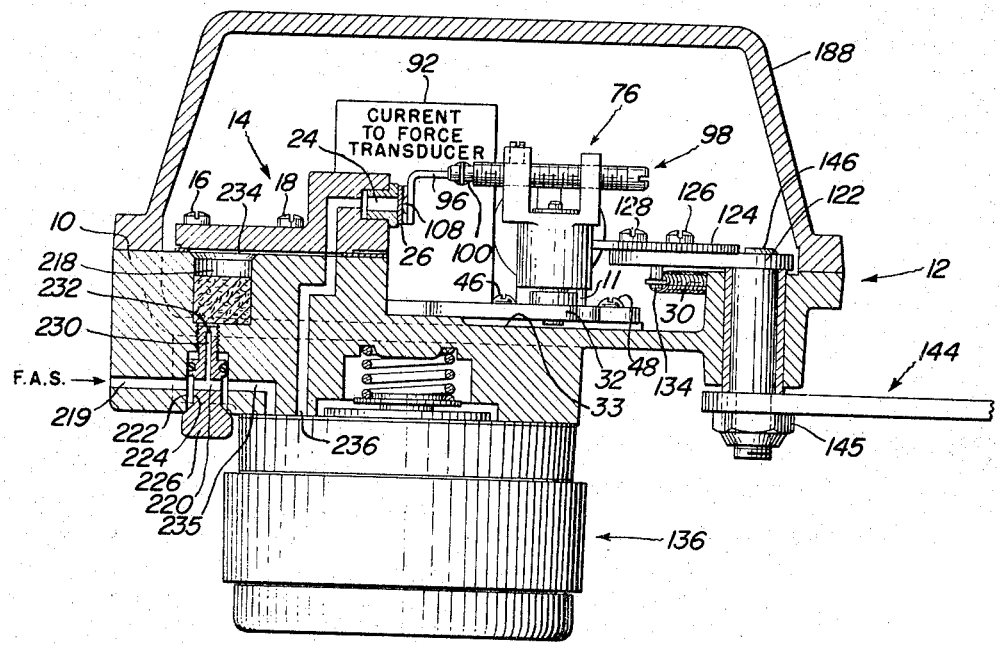
FIG. 5 is a sectional view taken along the line 5—5 of FIG. 3 with the top cover portion of the inclosure mounted thereon.
Figure 6:
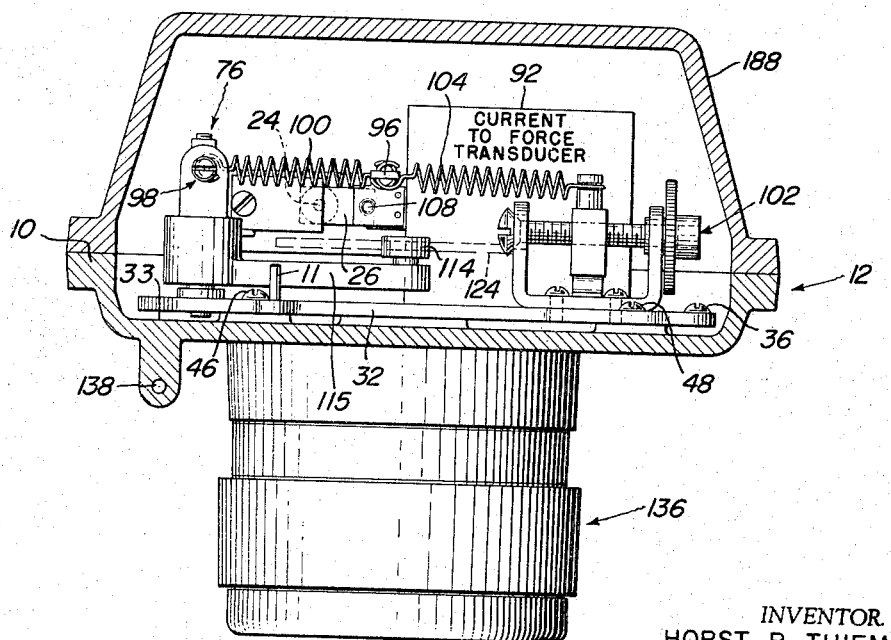
FIG. 6 is a sectional view taken along the line 6—6 of FIG. 3 with the top cover portion of the inclosure mounted thereon.

The chassis plate 32 is provided with a plurality of tapped holes through which some of the screws 50–72 are passed for interconnecting the chassis plate 32 with the parts of the electro-pneumatic transducer 74, shown in FIG. 2, and identical substitute parts of the electro-pneumatic positioner 76, shown in FIGS. 3, 5 and 6. The remaining screws are used to interconnect the digital positioner 78 shown in FIGS. 4 and 7 and identical substitute parts of the digital transducer used in FIG. 4a with the chassis plate 32.

The first part 10 of the inclosure 12 is comprised of any well-known, explosion-proof conduit 80 containing electrical conductors 82, 84 for transmitting an input electrical signal to a terminal block 86, as is shown for example in FIG. 2 and FIG. 3. This terminal block, in turn, is connected by means of conductors 88, 90 to a current-to-force transducer unit 92. Although not shown, this unit 92 contains magnets such as those disclosed in the P. E. Shafer Patent No. 2,847,619.

This unit 92 is constructed to transmit a force proportional to the magnitude of the input signal by way of the integral pivoted beam parts 94, 96. A threadedly-mounted range screw adjusting unit 98 is fixedly mounted on the chassis plate 32 in order to alter the force that the spring 100 applies in a downward direction to a beam part 96.

A threadedly-mounted zero screw adjusting unit 102 is fixedly mounted on the chassis plate 32 in order to alter the force that the spring 104 applies in an upward direction to the end beam part 96.

It can be seen from the aforementioned description of FIGS. 1, 3 and 4 that an end of a mechanical lever, such as the end of a screw driver 106, can be placed between the right rib 30 of the first incasement part 10 and the lower right edge of the chassis plate 32. If the screw driver 106 is then rotated, it will cause the plate 38 to move in a clockwise direction about the then partially tightened pivot screw 36 toward the flapper 26.

When the chassis has been moved to a suitable position, such as is illustrated by the solid-line position of the chassis shown in FIGS. 1, 3 and 4, the semi-spherical contacting portion 108 of the current-to-force transducer unit 92 will be operable to move the flapper between a fully-opened and a fully-closed position. It can thus be seen that the unique chassis plate 32 and first inclosure construction 10 thus provide a means of rapidly mounting a current-to-force transducer unit 92 of an electro-pneumatic pressure transducer 74 or an electro-pneumatic positioner 76. The electro-pneumatic pressure transducer shown in FIG. 2 is provided with an incased spring-biased diaphragm capsule unit 110. This diaphragm capsule unit 110 is, in turn, connected to a conduit 112. The conduit 112 is used to transmit a control output pressure generated for example within the nozzle 24 so that a negative feedback force is applied to the beam part 96 that is proportional to the input force of the current-to-force transducer 92. This control output pressure is applied to beam 96 by means of the integral diaphragm plate and rod 113, the roller 114, range spring adjusting lever 115 of the unit 98 and the spring 100 whose lower end is attached for movement therewith.

When it is desired to convert the electro-pneumatic transducer 74, shown in FIG. 2 into the electro-pneumatic positioner, shown in FIG. 3, the screws 116, 117 are removed and the entire diaphragm capsule unit 110 is removed together with the conduit 112, and a screw plug 118 is employed to seal off the fluid pressure connection 119 that is located in the flange 120 to which the conduit 112 was connected.

The cam support plate 122 is then rotated from its vertical position shown in FIG. 2 into the horizontal position in FIG. 3. A cam 124 is fixedly mounted on the support plate 122 by means of a screw connection 126, 128 and the spring 130 in the partially-stretched condition is respectively connected as shown in the drawing to pins 132, 134 that are, in turn, fixedly connected to plate 122 and the casing part 10.

The only other connection that need be made in the aforementioned conversion is to connect the fluid pressure output control signal being transmitted from the fluid pressure booster relay unit 136 shown in FIGS. 5 and 6 by means of the conduit 138 to the pressure-actuated diaphragm chamber 140 of a diaphragm-actuated valve 142 such as is shown in the dotted-line form in FIG. 3. This booster unit 136 is substantially the same type as that disclosed in the Horst R. Thieme application Ser. No. 210,624.

The construction of the linkage 144 shown in dotted-line form in FIG. 2 and FIG. 3 which transmits the motion of the valve stem in the form of rotary motion to the shaft 146 and the cam support plate 122 is also similar to that disclosed in detail in the aforementioned Horst R. Thieme application Ser. No. 210,624. In converting from an electro-pneumatic transducer to an electro-pneumatic positioner, nut 145 is removed and the linkage 144 is assembled as shown in FIG. 5.

It can thus be seen that no recalibration of the parts is necessary when it is desired to convert the electro-pneumatic transducer 74, shown in FIG. 2, into the electro-pneumatic positioner 76 shown in FIGS. 3, 5 and 6.

It can also be seen that the digital positioner 78 shown in FIG. 4 can be readily converted from a digital transducer by merely removing the capsule diaphragm unit 110 and conduit 112, shown in FIG. 4a, and replacing this unit with the screw plug 116, the cam 124, spring 130, and the valve stem linkage 144 in the same manner as that previously set forth under the conversion of the electro-pneumatic transducer of FIG. 2 into the electro-pneumatic positioner of FIG. 3.

It can also be seen that the digital transducer 79 in FIG. 4a and digital positioner shown in FIG. 4 also contain the same type of range spring adjusting unit 98 as that previously set forth under the description of FIGS. 2 and 3.

The only parts required to be replaced when converting the electro-pneumatic positioner in FIG. 3 into a digital positioner shown in FIG. 4 is the current-to-force transducer unit 92 and the zero adjusting spring 104.

Figure 7:
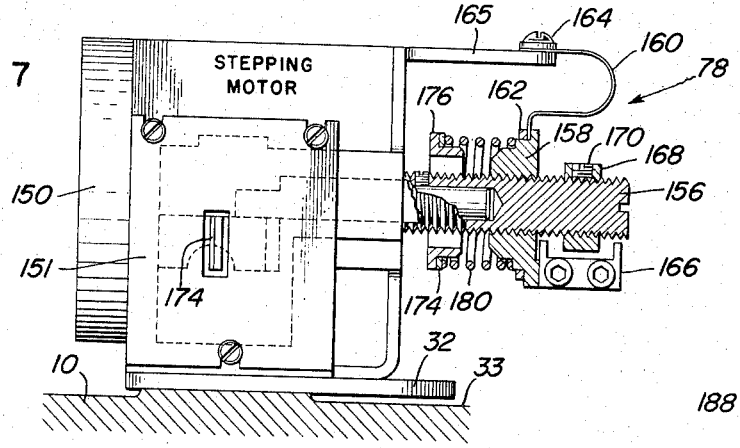
FIG. 7 shows a detailed section of the anti-spin strip for the traverse screw-mounted nut for the digital positioner shown in FIG. 4.

A stepping motor-flapper actuating unit 148 which is mounted on the chassis plate 32 is shown in FIGS. 4 and 7 being employed in lieu of the aforementioned unit 92 and spring 104 when it is desired to convert the electro-pneumatic positioner of FIG. 3 to a digital positioner shown in FIGS. 4 and 7.

The unit 148 is comprised of a bracket supported D.C. stepping motor 150, 151 constructed to receive a step pulse electrical input signal by way of a suitable number of transmitting conductor units 152, 154. The stepping motor 150 has a screw shaft 156 and a nut 158 connected for non-rotatable movement by means of a flexible spring plate 160 along the shaft 156. The spring plate 160 has one of its ends fixedly connected at 162 to the nut 158 by any suitable welding means and its other end connected by means of the screw 164 to a stationary member 165. The right end of the nut 158 is shown in FIG. 7 as being provided with a U-shaped plate 166. A threadedly-adjustable stop ring 168 is shown fixedly mounted on the right end portion of the screw shaft 156 by means of a set screw connection 170.

Tapered teeth 171, 172 are shown on the right and left sides of the ring 168 which engage the respective legs of the U-shaped plate 166 when the nut 158 is respectively moved to its extreme right and left end travel portions on the screw shaft 156.

The unit 148 is also comprised of a substantially J-shaped beam member 174. The upper end of the beam member 174 is provided with a ring portion 176 that surrounds the screw shaft 156 and which is also shown in spaced relation therewith. The lower portion of this beam member 174 has a beam part 176 that contains a semicircular flapper contacting portion 108a integral therewith. A flexible pivot schematically shown as reference numeral 178 in FIG. 4 pivotally supports the beam member 174 for pivotal movement in a seesaw beam fashion.

A compression spring 180 is shown located in a position to extend between the nut 158 and the upper ring portion 176 of the J-shaped pivoted beam member 174. The spring 180 is thus operable to apply a force to the beam member 174 that is proportional to the distance the nut 158 is caused to travel in either direction along the screw shaft 156.

In the digital positioner 78 shown in FIG. 4, an input signal is fed into the motor windings of the step motor 150 causing rotation of the threaded shaft 156. The nut 158 then travels up the shaft because it is restrained from rotation by the flexible spring plate 160. This motion allows the nut 158 to bear against the spring 180 which places a force on the J-shaped beam 174, 176 to move the flapper away from the nozzle 24. When the flapper 26 moves away from the nozzle 24, the air pressure within the nozzle is reduced. This back pressure is transmitted to a pneumatic booster relay 136 and since the pressure in the booster has been reduced, the pressure output signal to the diaphragm actuator 140 being applied by way of the previously-referred-to conduit 138 is also reduced. This lower output pressure allows the diaphragm actuator 140 to move upward under the influence of the actuator spring 182. As the actuator stem 186 moves up, the feedback cam 124 rotates counter-clockwise as does the cam follower 125. This action results in a force change on the flapper beam part 176 which opposes the force supplied by the input spring 180. When the forces of the beam are equal, the apparatus just described is in equilibrium and the control valve stem 186 has reached the new position called for by the step pulse electric input signal being fed into the stepping motor.

It can thus be seen, for the aforementioned description of the digital positioner, that when the one leg of the U-shaped plate 166 connected to the nut 158 is brought into engagement with the tooth 172 on stop ring 156 then zero pressure will be applied to the diaphragm actuating chamber 140 of the control valve by way of the conduit 138.

When the nut 158 is moved to the extreme right end of the screw shaft 156, tooth 171 will be engaged by the other leg of the plate 166 and full pressure will be applied to the diaphragm actuating chamber with which the digital positioner is associated, such as the type of actuating chamber 140 shown in FIG. 3.

Figure 8:
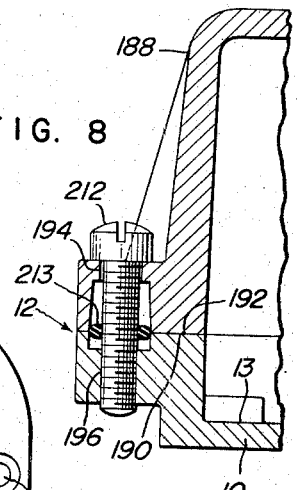
FIG. 8 is a typical section through one pair of the aligned aperture wall portions in the first and second portions of the casing showing how screw connections are employed to assemble these casing parts in an explosion-proof manner.

As can be seen in FIG. 8, the inclosure 12 is comprised of a first casing part 10 and a second casing part 188. Each of these parts 10 and 188 has a lapped surface 190, 192 which, when assembled, are brought into physical surface-to-surface contact with one another. A plurality of spaced-apart, cast holes is formed in the casing part 188, such as is shown at 194 immediately above the tapped holes 196, 198, 200, 202, 204, 206, 208, and 210 formed in the casing part 10.

A connector is passed through each of the aforementioned aligned holes in the casing parts 10, 188 in the same manner as that shown for the screw connector 212 shown in FIG. 8. It can be seen that the tightening of these screw connections will bring the lapped surfaces 190, 192 into explosion-proof, surface-to-surface contact with one another.

A resilient O-ring member is employed in each of the cast-out portions of the casing wall parts that surround the shank of each screw 212 in the same manner as that shown for the O-ring 213 in FIG. 8 in order to retain these screws in the casing part 188 when the screen is not threadedly engaged.

The casing 10 is provided with three flame arrester plugs 214, 216, 218 which are constructed of a porous metal or other equivalent material. If, for any reason, an ignitible gas does, perchance, happen to seep into the inside of the inclosure 12 and become ignited, the porous nature of the metal plug 214, 216, 218 will snuff out any flame that attempts to escape through these porous plugs. These flame arrester plugs 214, 216, 218 are also beneficial in allowing any smoke under pressure to be slowly passed therethrough to relieve the pressure within the inclosure.

A fluid under pressure is supplied by way of an external connection, 219, to the passageway 220 which, in turn, opens into the cylindrical passageway formed by the wall 222 of the casing 10 and the outer wall 224 of the flow-restricting screw 226, as shown in FIG. 5. Unrestricted passageway 232 formed in the flow-restricting screw 226 is connected by way of passageway 234 to the nozzle 24 and also connected by way of passageway 235 to the booster relay 136. The back pressure in the nozzle 24 is connected as an input pressure to the booster relay 136 by way of passageway 236.

It can be seen that a universal controlling apparatus has been disclosed which has numerous parts that can be rapidly mounted by way of a chassis plate in an explosion-proof inclosure which parts are readily interchangeable with one another to enable very rapid conversion of this apparatus into either an electro-pneumatic transducer, electro-pneumatic positioner, a digital transducer or a digital positioner without requiring the need of a highly-skilled calibration expert when these parts are assembled and disassembled in the inclosure.

What is claimed is:

An explosive proof inclosure comprising a first member forming a first portion of the inclosure, a flapper-nozzle pressure regulator fixedly connected to an inner wall portion of the first member, a chassis plate, means pivotally mounting the chassis plate on the first member, said chassis plate having a plurality of slots therethrough, a screw through each slot for fixedly connecting the chassis plate to the first member, said slots being arranged in a manner such that loosening of the screws frees the chassis plate for limited pivotal movement about said means, said chassis plate having an elongated leg portion extending between a pair of spaced apart ribs fixed to said first member for limiting pivotal movement of the chassis plate, a plurality of tapped holes in the chassis plate, input signal means mounted on the chassis plate via some of said tapped holes, said input means having a portion abutting the flapper portion of said flapper-nozzle regulator for variably positioning said flapper portion relative to said nozzle portion in response to a signal applied to said input means.

References Cited

UNITED STATES PATENTS

| | | | |
|---|---|---|---|
| 2,303,891 | 12/1942 | Moore | 137—85 |
| 2,487,266 | 11/1949 | Newell | 137—85 X |
| 2,651,468 | 9/1953 | Joesting | 137—85 X |
| 2,942,581 | 6/1960 | Gaffney | 137—85 X |
| 2,964,924 | 12/1960 | Dodge | 137—85 X |
| 3,082,782 | 3/1963 | Schuder | 137—85 |
| 3,132,661 | 5/1964 | Flesor | 137—85 |

ALAN COHAN, *Primary Examiner.*